(12) United States Patent
Xu et al.

(10) Patent No.: US 11,210,563 B2
(45) Date of Patent: Dec. 28, 2021

(54) METHOD AND APPARATUS FOR PROCESSING IMAGE

(71) Applicant: Beijing Baidu Netcom Science And Technology Co., LTD., Beijing (CN)

(72) Inventors: Zhimin Xu, Beijing (CN); Guoyi Liu, Beijing (CN); Xianglong Meng, Beijing (CN); Xiao Wang, Beijing (CN)

(73) Assignee: Beijing Baidu Netcom Science and Technology Co., Ltd.

( * ) Notice: Subject to any disclaimer, the term of this patent is extended or adjusted under 35 U.S.C. 154(b) by 0 days.

(21) Appl. No.: 16/813,494

(22) Filed: Mar. 9, 2020

(65) Prior Publication Data
US 2021/0064930 A1 Mar. 4, 2021

(30) Foreign Application Priority Data
Aug. 27, 2019 (CN) .......................... 201910794758.X

(51) Int. Cl.
*G06T 5/50* (2006.01)
*G06K 9/62* (2006.01)
*G06F 16/55* (2019.01)
*G06F 16/51* (2019.01)
*G06K 9/46* (2006.01)

(52) U.S. Cl.
CPC ........... *G06K 9/6257* (2013.01); *G06F 16/51* (2019.01); *G06F 16/55* (2019.01); *G06K 9/46* (2013.01)

(58) Field of Classification Search
CPC ...... G06K 9/6257; G06K 9/46; G06K 9/6201; G06F 16/55; G06F 16/51; G06F 16/583; G06N 3/08
See application file for complete search history.

(56) References Cited

U.S. PATENT DOCUMENTS

| | | | |
|---|---|---|---|
| 9,836,545 B2* | 12/2017 | LuVogt | G06Q 30/02 |
| 10,380,410 B2* | 8/2019 | Gold | G06K 9/00671 |
| 10,403,031 B2* | 9/2019 | Cole | G06T 15/205 |
| 11,069,047 B2* | 7/2021 | Liu | G06K 9/4652 |
| 2013/0129210 A1 | 5/2013 | Na | |
| 2015/0039583 A1* | 2/2015 | Liu | G06F 16/951 707/706 |
| 2017/0132676 A1* | 5/2017 | Mediratta | G06Q 30/0282 |

(Continued)

FOREIGN PATENT DOCUMENTS

CN 107391599 A 11/2017
CN 108595628 A 9/2018

OTHER PUBLICATIONS

Chinese Office Action dated Jul. 29, 2021 in CN Application No. 202011104612.7.

*Primary Examiner* — Gregory M Desire
(74) *Attorney, Agent, or Firm* — Weaver Austin Villeneuve & Sampson LLP

(57) ABSTRACT

Embodiments of the present disclosure provide a method and apparatus for processing an image. The method may include: acquiring a feature of a target image; acquiring a style of the target image, and searching a feature most similar to the feature of the target image from a set of image related information of the style, where the set of image related information comprises features of multiple groups of paired images; and using a paired image of an image corresponding to the found feature as a paired image of the target image and outputting the paired image of the target image.

15 Claims, 5 Drawing Sheets

(56) References Cited

U.S. PATENT DOCUMENTS

| | | | |
|---|---|---|---|
| 2019/0156395 A1* | 5/2019 | Bessega | G06F 16/9538 |
| 2019/0294259 A1 | 9/2019 | Liu et al. | |
| 2019/0347472 A1* | 11/2019 | Yu | G06K 9/6257 |
| 2020/0134797 A1* | 4/2020 | Zhang | H04N 1/6008 |
| 2020/0265495 A1* | 8/2020 | Cho | G06F 16/5854 |
| 2021/0026883 A1 | 1/2021 | Xu et al. | |
| 2021/0064930 A1* | 3/2021 | Xu | G06F 16/51 |

* cited by examiner

METHOD AND APPARATUS FOR PROCESSING IMAGE

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to the field of computer technology, specifically to the field of Internet technology, and more specifically to a method and apparatus for processing an image.

BACKGROUND

In daily life, in order to show intimate relationships, a user may use paired images on a network platform, for example, male and female protagonists in a cartoon.

In related technologies, it is often troublesome for the user to acquire such paired avatars. The user needs to manually search or capture the avatars, so the avatars are difficult to obtain quickly.

SUMMARY

Embodiments of the present disclosure provide a method and apparatus for processing an image.

In a first aspect, an embodiment of the present disclosure provides a method for processing an image, including: acquiring a feature of a target image; acquiring a style of the target image, and searching a feature most similar to the feature of the target image from a set of image related information of the style, where the set of image related information includes features of multiple groups of paired images; and using a paired image of an image corresponding to the found feature as a paired image of the target image and outputting the paired image of the target image.

In some embodiments, the acquiring a style of the target image includes: inputting the target image into a pre-trained image style determining model to obtain a style of the target image output from the image style determining model, where the image style determining model is used to characterize corresponding relationships between images and styles of the images.

In some embodiments, the set of image information comprises image related information under indexes; and the indexes are established by following approach: acquiring multiple groups of paired images, and inputting the acquired multiple groups of paired images into the image style determining model to obtain multiple styles of paired images; and establishing, for each style, an index of image related information of the style of paired images, wherein the index corresponding to the style comprises associatively stored image related information of each group of paired images among the acquired multiple groups of paired images.

In some embodiments, the acquiring multiple groups of paired images includes: extracting, by a pre-trained paired feature extracting model, a paired feature of each image in a set of images, where the paired feature extracting model is used to extract the paired feature of the image; and using each group of images having a high similarity of paired features in the set of images as paired images.

In some embodiments, the training of the paired feature extracting model includes: acquiring image pair samples and labeling information, wherein the labeling information is used to indicate the image pair samples being paired or unpaired images; and training a siamese network by using the image pair samples as inputs and the labeling information corresponding to the image pair samples as target outputs to obtain the paired feature extracting model.

In some embodiments, the image related information further includes a storage address of the paired image of the image, and before using the paired image of the image corresponding to the found feature as the paired image of the target image and outputting the paired image mage and outputting the paired image, the method further includes: determining a storage address of the paired image of the image corresponding to the found feature; and acquiring an image indicated by the storage address.

In some embodiments, the training of the image style determining model includes: acquiring a set of samples comprising multiple styles of images; and training an initial image style determining model by using the images as inputs and the styles of the images as target outputs to obtain the image style determining model.

In a second aspect, an embodiment of the present disclosure provides an apparatus for processing an image, including: an acquiring unit, configured to acquire a feature of a target image; a searching unit, configured to acquire a style of the target image, and search a feature most similar to the feature of the target image from a set of image related information of the style, wherein the set of image related information comprises features of multiple groups of paired images; and an output unit, configured to use a paired image of an image corresponding to the found feature as a paired image of the target image and output the paired image of the target image.

In some embodiments, the acquiring unit is configured to: input the target image into a pre-trained image style determining model to obtain a style of the target image output from the image style determining model, where the image style determining model is used to characterize corresponding relationships between images and styles of the images.

In some embodiments, the set of image information includes image related information under indexes; and the indexes are established by following approach: acquiring multiple groups of paired images, and inputting the acquired multiple groups of paired images into the image style determining model to obtain multiple styles of paired images; and establishing, for each style, an index of image related information of the style of paired images, wherein the index corresponding to the style comprises associatively stored image related information of each group of paired images among the acquired multiple groups of paired images.

In some embodiments, the acquiring multiple groups of paired images includes: extracting, by a pre-trained paired feature extracting model, a paired feature of each image in a set of images, where the paired feature extracting model is used to extract the paired feature of the image; and using each group of images having a high similarity of paired features in the set of images as paired images.

In some embodiments, the training of the paired feature extracting model includes: acquiring image pair samples and labeling information, wherein the labeling information is used to indicate the image pair samples being paired or unpaired images; and training a siamese network by using the image pair samples as inputs and the labeling information corresponding to the image pair samples as target outputs to obtain the paired feature extracting model.

In some embodiments, the image related information further includes a storage address of the paired image of the image, and the apparatus further includes: a determining unit, configured to determine, before the paired image of the image corresponding to the found feature is used as the paired image of the target image and output, a storage address of the paired image of the image corresponding to the found feature; and an image acquiring unit, configured to acquire an image indicated by the storage address.

In some embodiments, the training of the image style determining model includes: acquiring a set of samples comprising multiple styles of images; and training an initial image style determining model by using the images as inputs and the styles of the images as target outputs to obtain the image style determining model.

In a third aspect, an embodiment of the present disclosure provides an electronic device, including: one or more processors; and a storage apparatus, storing one or more programs, the one or more programs, when executed by the one or more processors, cause the one or more processors to implement the method according to any one embodiment in the method for processing an image.

In a fourth aspect, an embodiment of the present disclosure provides a computer-readable storage medium, storing a computer program thereon, the computer program, when executed by a processor, causes the processor to implement the method according to any one embodiment in the method for processing an image.

According to the image processing solution provided by the embodiments of the present disclosure, a feature of a target image is first acquired. Then, a style of the target image is acquired, and a feature most similar to the feature of the target image is searched from a set of image related information of the style, where the set of image related information includes features of multiple groups of paired images. Finally, a paired image of the image corresponding to the found feature is used as the paired image of the target image and output. The embodiments of the present disclosure can find the paired image consistent with the target image in style through the style of the target image, thereby improving the accuracy of searching the paired image. In addition, for any of paired images, a paired image can be found through the features of multiple groups of paired images in the present embodiment, and the paired image of the target image can also be determined more accurately.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
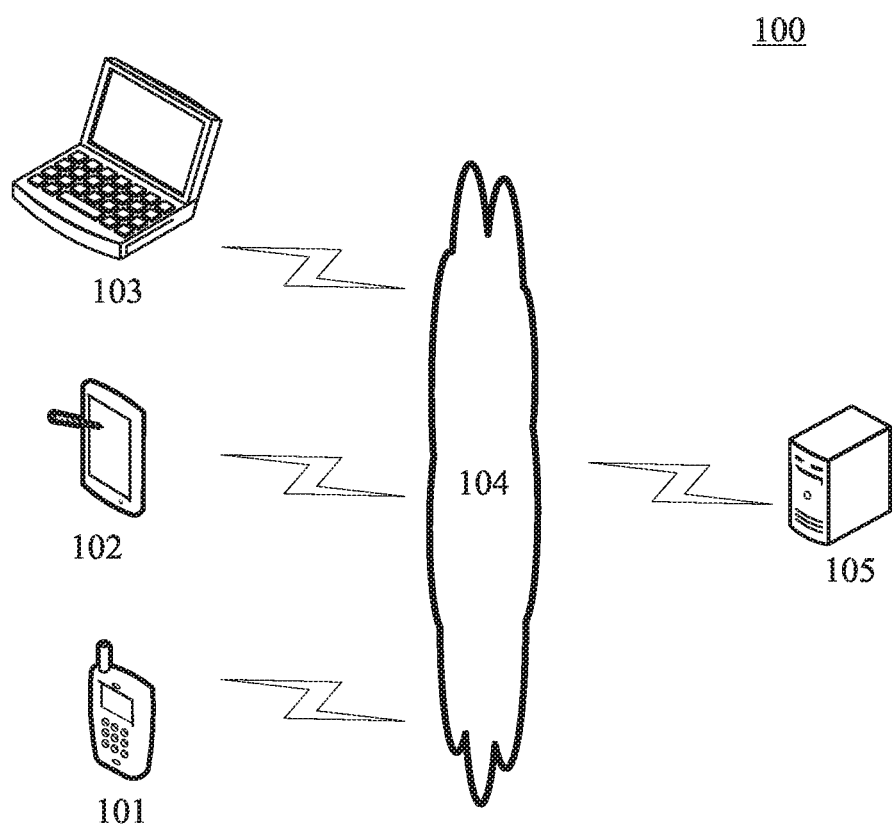
FIG. 1 is an architectural diagram of an exemplary system to which some embodiments of the present disclosure may be applied.

FIG. 1 shows an exemplary system architecture 100 to which a method for processing an image or an apparatus for processing an image according to some embodiments of the present disclosure may be applied.

As shown in FIG. 1, the system architecture 100 may include terminal devices 101, 102 and 103, a network 104, and a server 105. The network 104 serves as a medium providing a communication link between the terminal devices 101, 102 and 103 and the server 105. The network 104 may include various types of connections, such as wired or wireless communication links, or optical fiber cables.

A user may use the terminal devices 101, 102 and 103 to interact with the server 105 through the network 104 to receive or send messages, or the like. The terminal devices 101, 102 and 103 may be installed with various communication client applications, such as image processing applications, video applications, live broadcast applications, instant messaging tools, e-mail clients, and social platform software.

The terminal device 101, 102 and 103 here may be hardware or software. When the terminal devices 101, 102 and 103 are hardware, the terminal devices may be various electronic devices with display screens, including but not limited to a smart phone, a tablet computer, an e-book reader, a laptop portable computer, a desktop computer, etc. When the terminal devices 101, 102 and 103 are software, the terminal devices may be installed in the above-listed electronic devices. The terminal device may be implemented as a plurality of software programs or software modules (for example, a plurality of software programs or software modules for providing distributed services), or as a single software program or software module, Specific limitations are not provided here.

The server 105 may be a server providing various services, for example, a background server providing a support for the terminal devices 101, 102 and 103. The background server may process, for example, analyze the received data such as a target image, and feed the processing result (for example, a paired image of the target image) back to the terminal device.

It should be noted that the method for processing an image according to embodiments of the present disclosure may be performed by the server 105 or the terminal devices 101, 102 and 103. Accordingly, the apparatus for processing an image may be provided in the server 105 or the terminal devices 101, 102 and 103.

It should be understood that the numbers of the terminal devices, the network and the server in FIG. 1 are merely illustrative. Any number of terminal devices, networks and servers may be provided based on actual requirements.

Figure 2:
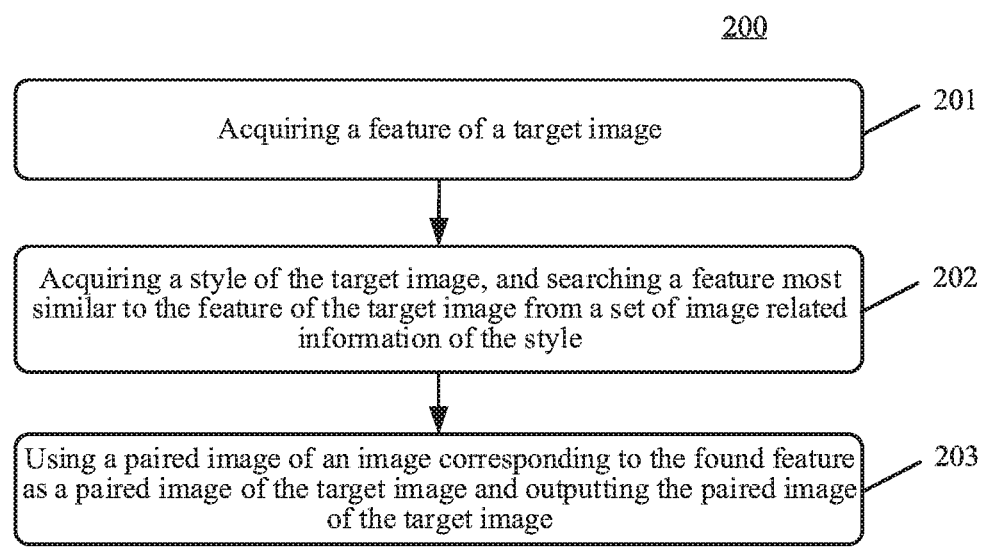
FIG. 2 is a flowchart of a method for processing an image according to an embodiment of the present disclosure.

Further, referring to FIG. 2, a flow 200 of a method for processing an image according to an embodiment of the present disclosure is shown. The method for processing an image includes the following steps.

Step 201: acquiring a feature of a target image.

In the present embodiment, the executing body (for example, the server or terminal device shown in FIG. 1) of the method for processing an image may acquire the feature of the target image. Specifically, the executing body may acquire the feature from other electronic device, or acquire the pre-stored feature locally. In addition, the executing body may alternatively acquire the target image and extract a feature of the target image to acquire the feature of the target image.

In practice, the executing body or other electronic device may extract the feature of the target image by using various models, for example, using a convolutional neural network, a residual neural network, an image network (ImageNet) model, a web face (WebFace) model, or the like.

Step 202: acquiring a style of the target image, and searching a feature most similar to the feature of the target image from a set of image related information of the style, where the set of image related information includes features of multiple groups of paired images.

In the present embodiment, the executing body may acquire the style of the target image. Thereafter, the executing body may search the feature most similar to the feature of the target image from the set of image related information of the style. Paired images refer to two images that match each other. Image related information is a variety of information related to images. Specifically, the image related information may include features of the images, and may further include the images and the like. A piece of image related information may include only the feature of an image, but not include the feature of a matching image of the image.

In practice, the executing body may acquire the style of the target image in various ways. For example, the executing body may directly acquire the existing style locally or from other electronic device, and may alternatively determine a style of the target image locally to acquire the style. The most similar feature may refer to a feature having the highest similarity to the feature of the target image. The found feature may be a feature of at least one image having the highest similarity to the feature. For example, the at least one image here may include an image having the highest similarity to the feature and an image having the second highest similarity to the feature.

Alternatively, in the process of determining the similarity, the features of images may be represented by coordinate system. If the distance between the features of two images is shorter, the similarity between the two images is larger. The executing body may determine, in response to the distance between the found feature and the feature of the target image being smaller than a preset threshold, a paired image of the image corresponding to the found feature as the paired image of the target image. If the distance between the found feature and the feature of the target image is not smaller than the preset threshold, it is determined that the paired image of the target image is not found.

The paired images may be represented in many forms, for example, the persons in two images are wearing couples dress, the backgrounds of two images are identical, the animated characters in two images have a pairing relationship (for example, Mickey Mouse and Minnie Mouse), the actions of persons in two images are associated (for example, arms of persons in the images respectively pose half heart), and/or the content layouts in images are consistent or symmetrical. The style of the image may be in many forms, such as color animation, black and white animation, sketch, stick figure, selfie or landscape photo, etc.

Step 203: using a paired image of an image corresponding to the found feature as a paired image of the target image and outputting the paired image of the target image.

In the present embodiment, the executing body may determine the image corresponding to the found feature. The paired image of the image is used as the paired image of the target image. In addition, the executing body may output the paired image. The image corresponding to the feature here refers to the image from which the feature is extracted.

Specifically, when the executing body is a terminal device, a processor of the executing body may output the paired image to other component, for example, to a display. When the executing body is a server, the executing body may send the paired image to other electronic device such as a terminal device, so as to output the paired image.

In practice, the executing body may determine the paired image of the image corresponding to the found feature in various ways. For example, when the image related information includes images and features corresponding to the images, the executing body may directly determine an image corresponding to the found feature, and determine a paired image of the image through a pre-stored image pairing relationship.

In some alternative implementations of the present embodiment, the image related information further includes a storage address of the paired image of the image, and before step 203, the method may further include: determining a storage address of the paired image of the image corresponding to the found feature; and acquiring the image indicated by the storage address.

In these alternative implementations, when the image related information includes the storage address of paired image of the image, the executing body may determine a storage address of a paired image of the image corresponding to the found feature. The image indicated by the storage address is acquired through the determined storage address.

In these implementations, the paired image of the target image may be quickly and accurately found through the storage address of the paired image of the image.

Figure 3:
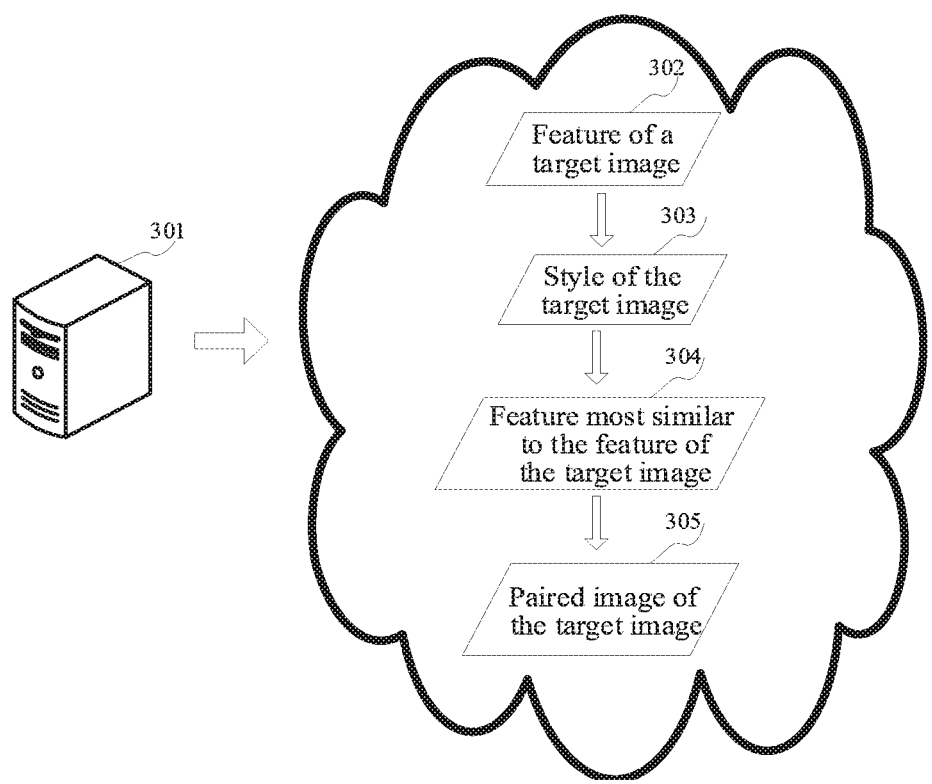
FIG. 3 is a schematic diagram of an application scenario of the method for processing an image according to an embodiment of the present disclosure.

Further, refer to FIG. 3, which is a schematic diagram of an application scenario of the method for processing an image according to the present embodiment. In the application scenario of FIG. 3, the executing body 301 may acquire a feature 302 of a target image, for example an image A; acquire a style 303 of the image A, for example, a stick figure style, and search a feature 304 most similar to the feature of the image A from a set of image related information of the stick figure style, where the set of image related information includes features of multiple groups of paired images; and use a paired image, i.e., an image B, of the image corresponding to the found feature as the paired image 305 of the image A and output the paired image 305.

The method according to the above embodiment of the present disclosure may find the paired image consistent with the target image in style through the style of the target image, thereby improving the accuracy of searching the paired image. In addition, for any of paired images, a paired image may be found through the features of multiple groups of paired images in the present embodiment, and the paired image of the target image may also be determined more accurately.

Figure 4:
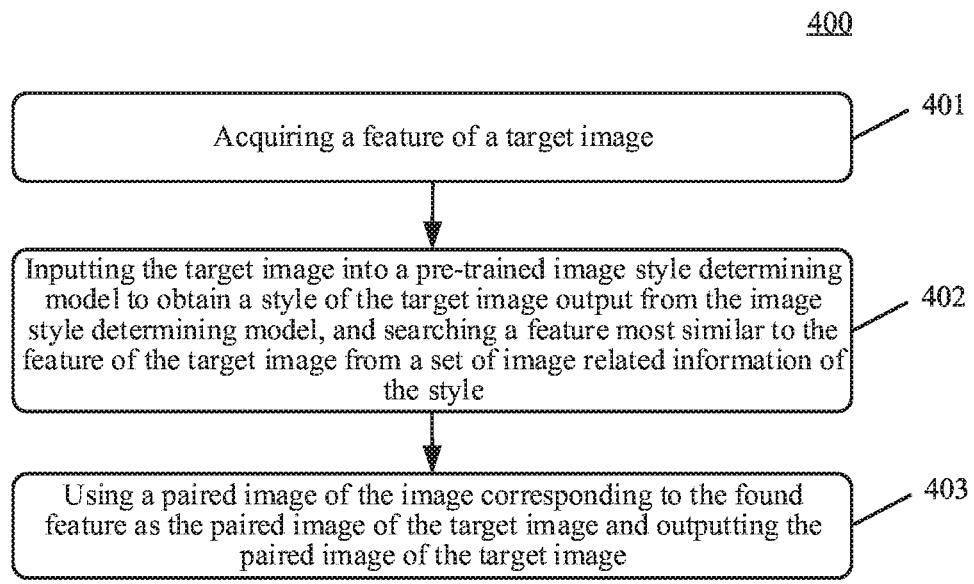
FIG. 4 is a flowchart of the method for processing an image according to another embodiment of the present disclosure.

Further, referring to FIG. 4, a flow 400 of another embodiment of the method for processing an image is shown. The flow 400 of the method for processing an image includes the following steps.

Step 401: acquiring a feature of a target image.

In the present embodiment, the executing body (for example, the server or terminal device shown in FIG. 1) of the method for processing an image may acquire the feature of the target image. Specifically, the executing body may acquire the feature from other electronic device, or acquire the pre-stored feature locally. In addition, the executing body may alternatively acquire the target image and extract a feature of the target image to acquire the feature of the target image.

Step 402: inputting the target image into a pre-trained image style determining model to obtain a style of the target image output from the image style determining model, and searching a feature most similar to the feature of the target image from a set of image related information of the style, where the image style determining model is used to characterize corresponding relationships between images and styles of the images, and the set of image related information includes features of multiple groups of paired images.

In the present embodiment, the executing body may determine the style of the target image through the image style determining model. The executing body inputs an image into the image style determining model, and the image style determining model may output the style of the image.

In some alternative implementations of the present embodiment, the training of the image style determining model may include: acquiring a set of samples including multiple styles of images; and training an initial image style determining model by using the images as inputs and the styles of the images as target outputs to obtain the image style determining model.

In these alternative implementations, different styles of images may be labeled with different labels or values. The executing body or other electronic device may predict a style of an image by using the initial image style determining model, determine a loss value between the predicted style and the labeled style by using a preset loss function, and perform training by using the loss value.

In these implementations, multiple styles of samples may be trained to obtain the image style determining model capable of determining different styles.

In some alternative implementations of the present embodiment, the set of image information includes image related information under indexes; and the indexes are established by the following approach: acquiring multiple groups of paired images, and inputting the acquired multiple groups of paired images into the image style determining model to obtain multiple styles of paired images; and establishing, for each style, an index of image related information of the style of paired images, where the index corresponding to the style includes associatively stored image related information of each group of paired images among the acquired multiple groups of paired images.

In these alternative implementations, the set of image information may be stored under the indexes, and the executing body or other electronic device may establish the indexes. Specifically, the executing body or other electronic device may determine the styles of multiple groups of paired images through the image style determining model, acquire image related information of these paired images, and then establish indexes to classify the image related information of these paired images according to the styles. Different styles correspond to different indexes.

In these implementations, indexes may be established according to the styles, so as to classify image related information of different styles. In this way, a paired image may be found faster and more accurately through the index corresponding to the style.

In some alternative application scenarios of these implementations, the acquiring multiple groups of paired images may include: extracting, by a pre-trained paired feature extracting model, a paired feature of each image in a set of images, where the paired feature extracting model is used to extract the paired feature of the image; and using each group of images having a high similarity of paired features in the set of images as paired images.

In these alternative application scenarios, the executing body may extract the paired feature of each image in the set of images through the paired feature extracting model. Every two images having a high similarity of paired features are used as the paired images. The paired feature is a feature of the image indicating whether the image is paired with other images. The high similarity of images may indicate that the distance between the paired features, represented by coordinate system, of the two images is smaller than a preset threshold. In addition, the high similarity of paired features may also indicate top-ranked paired features in a case where the distance between the paired features of two images is ranked from short to long.

In these application scenarios, whether images can be paired may be accurately determined by using the paired feature extracting model.

In some alternative cases of these application scenarios, the training of the paired feature extracting model may include: acquiring image pair samples and labeling information, where the labeling information is used to indicate that the image pair samples are paired or unpaired images; and training a siamese network by using the image pair samples as inputs and the labeling information corresponding to the image pair samples as target outputs to obtain the paired feature extracting model.

In these alternative cases, the executing body or other electronic device may train the paired feature extracting model by using image pairs. Specifically, the electronic device may use paired images in the image pairs as positive samples, use unpaired images in the image pairs as negative samples, and perform training by using the positive and negative samples.

The network structure of the siamese network here may include various networks for extracting features, such as a residual neural network or a convolutional neural network.

The executing body in these cases may train, by training the paired and unpaired images, the paired feature extracting model capable of accurately extracting paired features.

Step 403: using a paired image of the image corresponding to the found feature as the paired image of the target image and outputting the paired image of the target image.

In the present embodiment, the executing body may determine the image corresponding to the found feature. The paired image of the image is used as the paired image of the target image. In addition, the executing body may output the paired image. The image corresponding to the feature here refers to the image from which the feature can be extracted.

In the present embodiment, the style of the target image may be determined by the style determining model, so that the determined style is more accurate, and the found paired image is more accurate.

Figure 5:
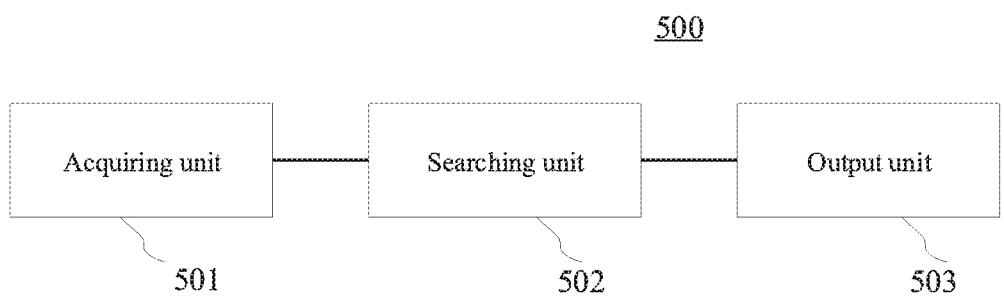
FIG. 5 is a schematic structural diagram of an apparatus for processing an image according to an embodiment of the present disclosure.

With further reference to FIG. 5, as an implementation of the method shown in the above figures, an embodiment of the present disclosure provides an apparatus for processing an image. The embodiment of the apparatus corresponds to the embodiment of the method shown in FIG. 2, and the apparatus may be applied to various electronic devices.

As shown in FIG. 5, the apparatus 500 for processing an image according to the present embodiment includes an acquiring unit 501, a searching unit 502, and an output unit 503. The acquiring unit 501 is configured to acquire a feature of a target image; the searching unit 502 is configured to acquire a style of the target image, and search a feature most similar to the feature of the target image from a set of image related information of the style, where the set of image related information includes features of multiple groups of paired images; and the output unit 503 is configured to use a paired image of an image corresponding to the found feature as a paired image of the target image and output the paired image of the target image.

In some embodiments, the acquiring unit 501 of the apparatus 500 for processing an image may acquire the feature from other electronic device, or acquire the pre-stored feature locally. In addition, the executing body may alternatively acquire the target image and extract a feature of the target image to acquire the feature of the target image.

In some embodiments, the searching unit 502 may acquire the style of the target image. Thereafter, the executing body may search the feature most similar to the feature of the target image from the set of image related information of the style. Paired images refer to two images that match each other. Image related information is a variety of information related to images. Specifically, the image related information may include features of the images, and may further include the images and the like. A piece of image related information may include only the feature of an image, but not include the feature of a matching image of the image.

In some embodiments, the output unit 503 may determine the image corresponding to the found feature. The paired image of the image is used as the paired image of the target image. In addition, the executing body may output the paired image. The image corresponding to the feature here refers to the image from which the feature is extracted.

In some alternative implementations of the present embodiment, the acquiring unit is configured to: input the target image into a pre-trained image style determining model to obtain a style of the target image output from the image style determining model, where the image style determining model is used to characterize corresponding relationships between images and styles of the images.

In some alternative implementations of the present embodiment, the set of image information includes image related information under indexes; and the indexes are established by the following approach: acquiring multiple groups of paired images, and inputting the acquired multiple groups of paired images into the image style determining model to obtain multiple styles of paired images; and establishing, for each style, an index of image related information of the style of paired images, where the index corresponding to the style includes associatively stored image related information of each group of paired images among the acquired multiple groups of paired images.

In some alternative implementations of the present embodiment, the acquiring multiple groups of paired images includes: extracting, by a pre-trained paired feature extracting model, a paired feature of each image in a set of images, where the paired feature extracting model is used to extract the paired feature of the image; and using each group of images having a high similarity of paired features in the set of images as paired images.

In some alternative implementations of the present embodiment, the training of the paired feature extracting model includes: acquiring image pair samples and labeling information, where the labeling information is used to indicate the image pair samples being paired or unpaired images; and training a siamese network by using the image pair samples as inputs and the labeling information corresponding to the image pair samples as target outputs to obtain the paired feature extracting model.

In some alternative implementations of the present embodiment, the image related information further includes a storage address of the paired image of the image, and the apparatus further includes: a determining unit, configured to determine, before the paired image of the image corresponding to the found feature is used as the paired image of the target image and output, a storage address of the paired image of the image corresponding to the found feature; and an image acquiring unit, configured to acquire the image indicated by the storage address.

In some alternative implementations of the present embodiment, the training of the image style determining model include: acquiring a set of samples including multiple styles of images; and training an initial image style determining model by using the images as inputs and the styles of the images as target outputs to obtain the image style determining model.

Figure 6:
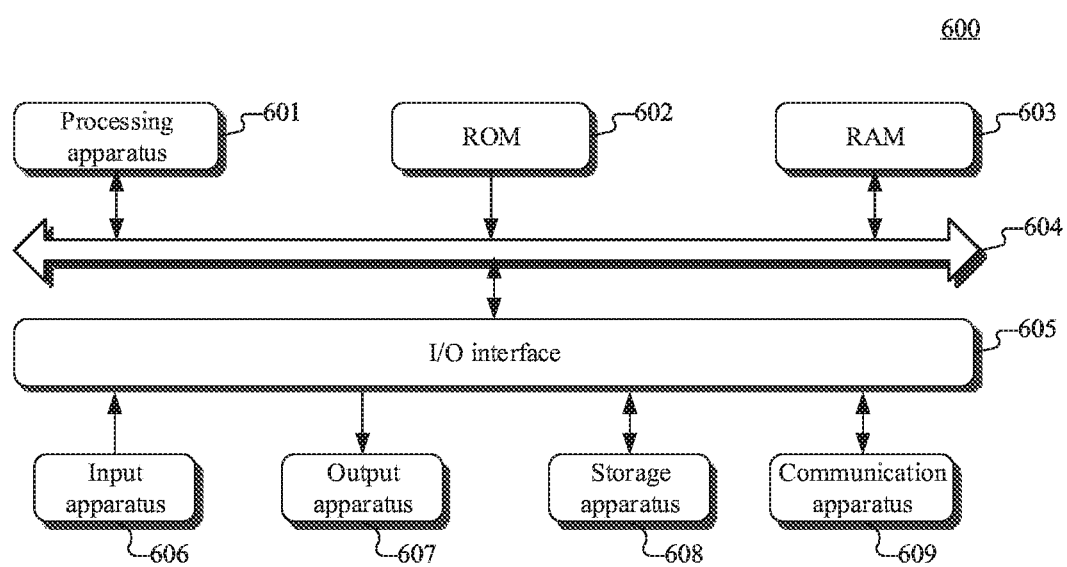
FIG. 6 is a schematic structural diagram of a computer system adapted to implement an electronic device of some embodiments of the present disclosure.

As shown in FIG. 6, the electronic device 600 may include a processing apparatus (e.g., a central processing unit, a Graphics Processing Unit, etc.) 601, which may execute various appropriate operations and processes according to a program stored in a read-only memory (ROM) 602 or a program loaded into a random access memory (RAM) 603 from a storage apparatus 608. The RAM 603 also stores various programs and data required by the operations of the electronic device 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 including, for example, a touch screen, a touch pad, a keyboard, a mouse, a camera, a microphone, an accelerometer, a gyroscope, etc.; an output apparatus 607 including, for example, a liquid crystal display (LCD), a speaker, a vibrator, etc.; a storage apparatus 608 including, for example, a magnetic tape, a hard disk, etc.; and a communication apparatus 609. The communication apparatus 609 may allow wireless or wired communication between the electronic device 600 and other device to exchange data. Although FIG. 6 illustrates the electronic device 600 having various apparatuses, it should be understood that all the illustrated apparatuses are not required to be implemented or included. More or less apparatuses may be alternatively implemented or included. Each block shown in FIG. 6 may represent an apparatus or a plurality of apparatuses as required.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication apparatus 609, or may be installed from the storage apparatus 608, or may be installed from the ROM 602. The computer program, when executed by the processing apparatus 601, implements the functions as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in some embodiments of the present disclosure may be implemented by software or hardware. The described units may alternatively be provided in a processor, for example, described as: a processor including an acquiring unit, a searching unit, and an output unit. The names of the units do not constitute a limitation to such units themselves in some cases. For example, the acquiring unit may be further described as "a unit configured to acquire a feature of a target image."

In another aspect, an embodiment of the present disclosure further provides a computer readable medium. The computer readable medium may be included in the electronic device described in the above embodiments, or a stand-alone computer readable medium without being assembled into the electronic device. The computer readable medium stores one or more programs. The one or more programs, when executed by the electronic device, cause the electronic device to: acquire a feature of a target image; acquire a style of the target image, and search a feature most similar to the feature of the target image from a set of image related information of the style, where the set of image related information comprises features of multiple groups of paired images; and use a paired image of an image corresponding to the found feature as a paired image of the target image and output the paired image of the target image.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for processing an image, comprising:
    acquiring a feature of a target image;
    acquiring a style of the target image, and searching a feature most similar to the feature of the target image from a set of image related information of the style, wherein the set of image related information comprises features of multiple groups of paired images; and
    using a paired image of an image corresponding to the found feature as a paired image of the target image and outputting the paired image of the target image.

2. The method according to claim 1, wherein the acquiring a style of the target image comprises:

inputting the target image into a pre-trained image style determining model to obtain a style of the target image output from the image style determining model, wherein the image style determining model is used to characterize corresponding relationships between images and styles of the images.

3. The method according to claim 2, wherein the set of image information comprises image related information under indexes; and the indexes are established by following approach:

acquiring multiple groups of paired images, and inputting the acquired multiple groups of paired images into the image style determining model to obtain multiple styles of paired images; and establishing, for each style, an index of image related information of the style of paired images, wherein the index corresponding to the style comprises associatively stored image related information of each group of paired images among the acquired multiple groups of paired images.

4. The method according to claim 3, wherein the acquiring multiple groups of paired images comprises:

extracting, by a pre-trained paired feature extracting model, a paired feature of each image in a set of images, wherein the paired feature extracting model is used to extract the paired feature of the image; and using each group of images having a high similarity of paired features in the set of images as paired images.

5. The method according to claim 4, wherein the training of the paired feature extracting model comprises:

acquiring image pair samples and labeling information, wherein the labeling information is used to indicate the image pair samples being paired or unpaired images; and training a Siamese network by using the image pair samples as inputs and the labeling information corresponding to the image pair samples as target outputs to obtain the paired feature extracting model.

6. The method according to claim 2, wherein the training of the image style determining model comprises:

acquiring a set of samples comprising multiple styles of images; and training an initial image style determining model by using the images as inputs and the styles of the images as target outputs to obtain the image style determining model.

7. The method according to claim 1, wherein the image related information further comprises a storage address of the paired image of the image, and before using the paired image of the image corresponding to the found feature as the paired image of the target image and outputting the paired image, the method further comprises:

determining a storage address of the paired image of the image corresponding to the found feature; and acquiring an image indicated by the storage address.

8. A non-transitory computer-readable storage medium, storing a computer program thereon, the computer program, when executed by a processor, causes the processor to implement the method according to claim 1.

9. An apparatus for processing an image, comprising:

at least one processor; and a memory storing instructions, wherein the instructions when executed by the at least one processor, cause the at least one processor to perform operations, the operations comprising:

acquiring a feature of a target image;

acquiring a style of the target image, and searching a feature most similar to the feature of the target image from a set of image related information of the style, wherein the set of image related information comprises features of multiple groups of paired images; and using a paired image of an image corresponding to the found feature as a paired image of the target image and output the paired image of the target image.

10. The apparatus according to claim 9, wherein the acquiring a style of the target image comprises:

inputting the target image into a pre-trained image style determining model to obtain a style of the target image output from the image style determining model, wherein the image style determining model is used to characterize corresponding relationships between images and styles of the images.

11. The apparatus according to claim 10, wherein the set of image information comprises image related information under indexes; and the indexes are established by following approach:

acquiring multiple groups of paired images, and inputting the acquired multiple groups of paired images into the image style determining model to obtain multiple styles of paired images; and establishing, for each style, an index of image related information of the style of paired images, wherein the index corresponding to the style comprises associatively stored image related information of each group of paired images among the acquired multiple groups of paired images.

12. The apparatus according to claim 11, wherein the acquiring multiple groups of paired images comprises:

extracting, by a pre-trained paired feature extracting model, a paired feature of each image in a set of images, wherein the paired feature extracting model is used to extract the paired feature of the image; and using each group of images having a high similarity of paired features in the set of images as paired images.

13. The apparatus according to claim 12, wherein the training of the paired feature extracting model comprises:

acquiring image pair samples and labeling information, wherein the labeling information is used to indicate the image pair samples being paired or unpaired images; and training a Siamese network by using the image pair samples as inputs and the labeling information corresponding to the image pair samples as target outputs to obtain the paired feature extracting model.

14. The apparatus according to claim 10, wherein the training of the image style determining model comprise:

acquiring a set of samples comprising multiple styles of images; and training an initial image style determining model by using the images as inputs and the styles of the images as target outputs to obtain the image style determining model.

15. The apparatus according to claim 9, wherein the image related information further comprises a storage address of the paired image of the image, and before using the paired image of the image corresponding to the found feature as the paired image of the target image and outputting the paired image, the operations further comprise:

determining, before the paired image of the image corresponding to the found feature is used as the paired image of the target image and output, a storage address of the paired image of the image corresponding to the found feature; and acquiring an image indicated by the storage address.

* * * * *